(12) United States Patent
Pan et al.

(10) Patent No.: US 11,012,266 B2
(45) Date of Patent: May 18, 2021

(54) SUB-CARRIER ESTIMATION METHOD AND APPARATUS IN MULTI-CARRIER COMMUNICATION SYSTEM

(71) Applicant: SHANGHAI EASTSOFT MICROELECTRONICS CO., LTD., Shanghai (CN)

(72) Inventors: Song Pan, Shanghai (CN); Liwei Shen, Shanghai (CN); Guangsheng Chen, Shanghai (CN)

(73) Assignee: SHANGHAI EASTSOFT MICROELECTRONICS CO., LTD., Shanghai (CN)

(*) Notice: Subject to any disclaimer, the term of this patent is extended or adjusted under 35 U.S.C. 154(b) by 241 days.

(21) Appl. No.: 16/221,389

(22) Filed: Dec. 14, 2018

(65) Prior Publication Data

US 2019/0123942 A1 Apr. 25, 2019

Related U.S. Application Data

(63) Continuation of application No. PCT/CN2017/078536, filed on Mar. 29, 2017.

(30) Foreign Application Priority Data

Mar. 29, 2017 (CN) .......................... 201710066232.0

(51) Int. Cl.
*H04L 12/26* (2006.01)
*H04L 25/03* (2006.01)
*H04L 27/26* (2006.01)

(52) U.S. Cl.
CPC ...... *H04L 25/03178* (2013.01); *H04L 27/265* (2013.01); *H04L 27/2647* (2013.01); *H04L 2025/03414* (2013.01)

(58) Field of Classification Search
None
See application file for complete search history.

(56) References Cited

U.S. PATENT DOCUMENTS

| 2009/0067520 A1* | 3/2009 | Gallizio | ............... H04L 25/0242 375/260 |
| 2010/0183104 A1* | 7/2010 | Alexander | ............... H04B 1/16 375/346 |
| 2013/0272147 A1* | 10/2013 | Vermani | ............... H04L 1/0668 370/252 |

FOREIGN PATENT DOCUMENTS

| CN | 101601244 A | 12/2009 |
| CN | 102833012 A | 12/2012 |

(Continued)

OTHER PUBLICATIONS

The Chinese Search Report of corresponding Chinese application No. 201710066232.0.

(Continued)

*Primary Examiner* — Zewdu A Beyen
(74) *Attorney, Agent, or Firm* — J.C. Patents (57) ABSTRACT

Provided are a sub-carrier estimation method in a multi-carrier communication system and an apparatus. The method includes: receiving a data frame transmitted by a transmitting end, and extracting a training sequence from the data frame; performing fast Fourier transform operation on the training sequence and a preset reference sequence, respectively, to obtain frequency domain data of the training sequence and frequency domain data of the reference sequence, and conjugately multiplying the two kinds of frequency domain data; extracting real part of conjugate multiplication result; averaging values in each column of an M×N array, respectively, to obtain an output array of 1 row and N columns; and estimating, according to the value in each column of the output array of 1 row and N columns, (Continued)

whether valid data is transmitted over N sub-carriers corresponding to the output array of 1 row and N columns.

20 Claims, 2 Drawing Sheets

(56) References Cited

FOREIGN PATENT DOCUMENTS

| CN | 103227766 A | 7/2013 |
|---|---|---|
| WO | WO 2007/105925 A1 | 9/2007 |
| WO | 2008062131 A1 | 5/2008 |

OTHER PUBLICATIONS

The International Search Report of corresponding International PCT Application No. PCT/CN2017/078536, dated Oct. 31, 2017.

* cited by examiner

SUB-CARRIER ESTIMATION METHOD AND APPARATUS IN MULTI-CARRIER COMMUNICATION SYSTEM

CROSS-REFERENCE TO RELATED APPLICATIONS

This application is a continuation of International Application No. PCT/CN2017/078536 filed on Mar. 29, 2017, which claims the priority benefit of China Patent Application No. 201710066232.0 filed on Feb. 6, 2017. The contents of the above identified applications are incorporated herein by reference in their entireties.

TECHNICAL FIELD

The present disclosure relates to the field of communications and, in particular, to a sub-carrier estimation method in a multi-carrier communication system and an apparatus.

BACKGROUND

Multi-carrier modulation techniques have strong anti-interference ability and high spectrum utilization efficiency, which can effectively resist frequency selective fading and have been widely used in broadband communication systems. Orthogonal frequency division multiplexing (Orthogonal Frequency Division Multiplexing, OFDM) is one of the multi-carrier modulation techniques. It is implemented with low complexity, and can eliminate inter-symbol interference and effectively resist multipath effect. Therefore, it is widely used in power line communication systems and wireless communication systems.

During practical use, in a multi-carrier communication system, a moderate amount of sub-carriers and frequency bands with less interference are often selected to transmit valid data, instead of frequency bands with large interference. The accuracy of the estimation on the number of sub-carriers and positions of the sub-carriers by the receiving end directly affects subsequent demodulation operations.

In the prior art, the sub-carrier estimation is usually made using an autocorrelation method, while the accuracy of the estimation on the number of sub-carriers and the positions of the sub-carriers is poor. In order to improve the accuracy of the sub-carrier estimation, a KS (Kolmogorov-Smirnov) test method or a higher-order cyclic cumulant method is introduced in some sub-carrier estimation methods, resulting in a very large computational burden for the sub-carrier estimation.

SUMMARY

The technical problem to be solved in the present disclosure is to improve accuracy of sub-carrier estimation while the sub-carrier estimation is implemented with low complexity.

To solve the above technical problem, an embodiment of the present disclosure provides a sub-carrier estimation method in a multi-carrier communication system, including: receiving a data frame transmitted by a transmitting end, and extracting a training sequence from the data frame; performing a fast Fourier transform operation on the training sequence and a preset reference sequence, respectively, to obtain frequency domain data of the training sequence and frequency domain data of the reference sequence, and conjugately multiplying the frequency domain data of the training sequence by the frequency domain data of the reference sequence; extracting a real part of a conjugate multiplication result, where the real part of the conjugate multiplication result is an M×N array, with M being the number of symbols of the training sequence, and N being the number of points of the fast Fourier transform operation; averaging all values in each column of the M×N array, respectively, to obtain an output array of 1 row and N columns; and estimating, according to a value in each column of the output array of 1 row and N columns, whether valid data is transmitted over N sub-carriers corresponding to the output array of 1 row and N columns.

Optionally, the estimating, according to the value in each column of the output array of 1 row and N columns, whether the valid data is transmitted over the N sub-carriers corresponding to the output array of 1 row and N columns includes: sequentially comparing values in the output array of 1 row and N columns with a first threshold that is preset; when an $l^{th}$ value in the output array of 1 row and N columns is greater than the first threshold, it is determined that the valid data is transmitted over an $l^{th}$ sub-carrier of the N sub-carriers; and when the $l^{th}$ value in the output array of 1 row and N columns is not greater than the first threshold, it is determined that no valid data is transmitted over the $l^{th}$ sub-carrier of the N sub-carriers; where $1 \leq l \leq N$.

Optionally, the N sub-carriers are divided into k sub-carrier groups, sub-carriers in any of the sub-carrier groups are adjacent to each other in a frequency domain, and there is no intersection between any two of the sub-carrier groups; the estimating, according to the value in each column of the output array of 1 row and N columns, whether the valid data is transmitted over the N sub-carriers corresponding to the output array of 1 row and N columns includes: acquiring, from the output array of 1 row and N columns, values corresponding to all sub-carriers in each sub-carrier group, respectively; and estimating whether the valid data is transmitted over all sub-carriers in the each sub-carrier group, respectively.

Optionally, the estimating whether the valid data is transmitted over all sub-carriers in the each sub-carrier group, respectively, includes: calculating an average value for values corresponding to all sub-carriers in the each sub-carrier group, and comparing the average value with a second threshold that is preset; when the average value for the values corresponding to all sub-carriers in the each sub-carrier group is greater than the second threshold, it is determined that the valid data is transmitted over all sub-carriers in the each sub-carrier group; and when the average value for the values corresponding to all sub-carriers in the each sub-carrier group is not greater than the second threshold, it is determined that no valid data is transmitted over any of the sub-carriers in the each sub-carrier group.

Optionally, after estimating whether the valid data is transmitted over the N sub-carriers corresponding to the output array of 1 row and N columns, the method further includes: counting the number of sub-carriers, over which the valid data is transmitted, in the N sub-carriers.

Optionally, before extracting the training sequence from the data frame, the method further includes: performing synchronization processing on data in the data frame.

Optionally, the training sequence includes any one of: a preamble sequence in the data frame for synchronization; or a data sequence that is preset in the data frame.

An embodiment of the present disclosure further provides a sub-carrier estimation apparatus in a multi-carrier communication system, including: a receiving unit, configured to receive a data frame transmitted by a transmitting end; a training sequence extracting unit, configured to extract a training sequence from the data frame; a fast Fourier transform operation unit, configured to perform a fast Fourier transform operation on the training sequence and a preset reference sequence, respectively, to obtain frequency domain data of the training sequence and frequency domain data of the reference sequence; a multiplication unit, configured to conjugately multiply the frequency domain data of the training sequence by the frequency domain data of the reference sequence; a real part extracting unit, configured to extract a real part of a conjugate multiplication result, where the real part of the conjugate multiplication result is an M×N array, with M being the number of symbols of the training sequence, and N being the number of points of the fast Fourier transform operation; a calculation unit, configured to average all values in each column of the M×N array, respectively, to obtain an output array of 1 row and N columns; and an estimating unit, configured to estimate, according to a value in each column of the output array of 1 row and N columns, whether valid data is transmitted over N sub-carriers corresponding to the output array of 1 row and N columns.

Optionally, the estimating unit is configured to sequentially compare values in the output array of 1 row and N columns with a first threshold that is preset; when an $l^{th}$ value in the output array of 1 row and N columns is greater than the first threshold, it is determined that the valid data is transmitted over an $l^{th}$ sub-carrier of the N sub-carriers; and when the $l^{th}$ value in the output array of 1 row and N columns is not greater than the first threshold, it is determined that no valid data is transmitted over the $l^{th}$ sub-carrier of the N sub-carriers; where $1 \leq l \leq N$.

Optionally, the N sub-carriers are divided into k sub-carrier groups, sub-carriers in any of the sub-carrier groups are adjacent to each other in a frequency domain, and there is no intersection between any two of the sub-carrier groups; the estimating unit is configured to: acquire, from the output array of 1 row and N columns, values corresponding to all sub-carriers in each sub-carrier group, respectively; and estimate whether the valid data is transmitted over all sub-carriers in the each sub-carrier group, respectively.

Optionally, the estimating unit is further configured to: calculate an average value for values corresponding to all sub-carriers in the each sub-carrier group, and compare the average value with a second threshold that is preset; when the average value for the values corresponding to all sub-carriers in the each sub-carrier group is greater than the second threshold, it is determined that the valid data is transmitted over all sub-carriers in the each sub-carrier group; and when the average value for the values corresponding to all sub-carriers in the each sub-carrier group is not greater than the second threshold, it is determined that no valid data is transmitted over any of the sub-carriers in the each sub-carrier group.

Optionally, the sub-carrier estimation apparatus in the multi-carrier communication system further includes: a counting unit, configured to count the number of sub-carriers, over which the valid data is transmitted, in the N sub-carriers.

Optionally, the sub-carrier estimation apparatus in the multi-carrier communication system further includes: a synchronization processing unit, configured to perform synchronization processing on data in the data frame before the training sequence extracting unit extracts the training sequence from the data frame.

Optionally, the training sequence includes any one of: a preamble sequence in the data frame for synchronization; or a data sequence preset in the data frame.

Compared with the prior art, the technical solutions in embodiments of the present disclosure have the following beneficial effects:

An M×N array is obtained by conjugately multiplying a training sequence extracted from a data frame by a preset reference sequence and extracting a real part of the resulting product. An output array of 1 row and N columns is obtained by averaging values in each column of the M×N array, and it is estimated whether valid data is transmitted over N sub-carriers corresponding to the output array of 1 row and N columns. There is no need to introduce a complicated mathematical model in estimating whether valid data is transmitted over the sub-carriers. Whether the valid data is transmitted over the sub-carriers is attainable provided that a simple operation is performed. Therefore, a computation burden is effectively reduced for the sub-carrier estimation. The output array of 1 row and N columns is obtained by extracting the real part of the conjugate multiplication result, and averaging values corresponding to each column. It is estimated, according to the values in each column of the output array of 1 row and N columns, whether the valid data is transmitted over the N sub-carriers. Therefore, the accuracy of the sub-carrier estimation can be improved.

Further, the N sub-carriers are divided into k sub-carrier groups to estimate whether the valid data is transmitted over the respective sub-carrier groups. When it is determined that the valid data is transmitted over one sub-carrier group, it is determined that the valid data is transmitted over all sub-carriers in the sub-carrier group. Therefore, the accuracy and efficiency of the sub-carrier estimation can be improved.

Further, by counting the number of all sub-carriers of the N sub-carriers over which the valid data is transmitted, it is possible to accurately know how many sub-carriers the valid data is currently transmitted over.

In addition, using a preamble sequence in the data frame for synchronization as the training sequence can reduce the length of the data frame and improve data transmission efficiency.

DESCRIPTION OF EMBODIMENTS

In the prior art, the sub-carrier estimation is usually made using an autocorrelation method. However, in the event of using the autocorrelation sub-carrier estimation method in low signal to noise ratio environment, the accuracy of the estimation on the number of sub-carriers and the positions of the sub-carriers would be poor. In order to improve the accuracy of the sub-carrier estimation, a KS (Kolmogorov-Smirnov) test method or a higher-order cyclic cumulant method is introduced in some sub-carrier estimation methods, resulting in a large computational burden and a high computational complexity in the sub-carrier estimation.

In an embodiment of the present disclosure, an M×N array is obtained by conjugately multiplying a training sequence extracted from a data frame by a preset reference sequence and extracting a real part of the resulting product. An output array of 1 row and N columns is obtained by averaging values in each column of the M×N array, and it is estimated whether valid data is transmitted over N sub-carriers corresponding to the output array of 1 row and N columns. There is no need to introduce a complicated mathematical model in estimating whether valid data is transmitted over the sub-carriers. Whether the valid data is transmitted over the sub-carriers is attainable provided that a simple operation is performed. Therefore, a computation burden is effectively reduced for the sub-carrier estimation. The output array of 1 row and N columns is obtained by extracting the real part of the conjugate multiplication result, and averaging values corresponding to each column. It is estimated, according to the value in each column of the output array of 1 row and N columns, whether the valid data is transmitted over the N sub-carriers. Therefore, the accuracy of the sub-carrier estimation can be improved.

The described objectives, features and beneficial effects of the present disclosure will become more apparent from the detailed description of embodiments of the present disclosure.

Figure 1:
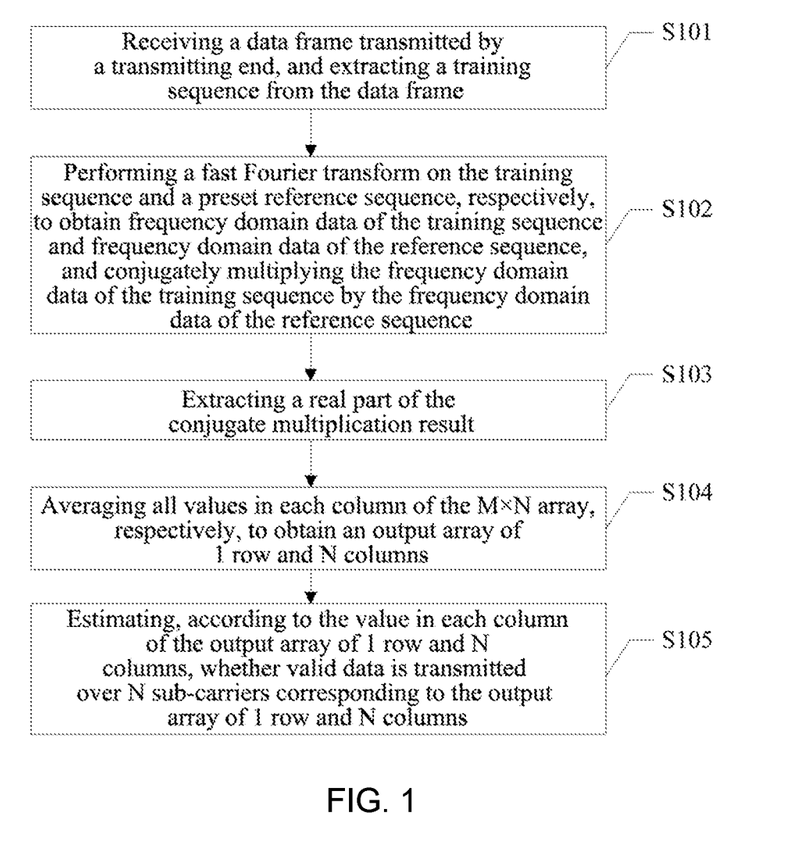
FIG. 1 is a flow chart of a sub-carrier estimation method in a multi-carrier communication system according to an embodiment of the present disclosure.

An embodiment of the present disclosure provides a sub-carrier estimation method in a multi-carrier communication system, of which specific steps will be described hereunder in detail with reference to FIG. 1.

Step S101, receiving a data frame transmitted by a transmitting end, and extracting a training sequence from the data frame.

In a specific implementation, after receiving the data frame transmitted by the transmitting end, a receiving end can first perform synchronization processing on the received data in the data frame. After the synchronization processing is completed, the training sequence is extracted from the data frame.

When generating the data frame, the transmitting end can add an independent data sequence in the data frame in advance as the training sequence. That is to say, in addition to the valid data that needs to be transmitted, a preset training sequence is also included in the data frame transmitted by the transmitting end.

After the data frame is received and the synchronization is completed by the receiving end, the training sequence can be extracted from the data frame. In ideal channel conditions, when the data frame is not subject to interference during a channel transmission, there would be no change in the data of the training sequence from the data frame.

When the data sequence is added in the data frame as the training sequence, the length of the data frame will be relatively long. In another embodiment of the present disclosure, a preamble sequence for synchronization in the data frame is used as the training sequence. Since the preamble sequence needs to be set in each data frame, the length of the data frame can be reduced by reusing the preamble sequence.

Step S102, performing a fast Fourier transform on the training sequence and a preset reference sequence, respectively, to obtain frequency domain data of the training sequence and frequency domain data of the reference sequence, and conjugately multiplying the frequency domain data of the training sequence by the frequency domain data of the reference sequence.

In a specific implementation, a reference sequence can be preset at the receiving end, and the reference sequence is the same as the training sequence that is set at the transmitting end.

The training sequence extracted from the data frame is time domain data, and the time domain data of the training sequence can be converted into frequency domain data of the training sequence via a fast Fourier transform (Fast Fourier Transform, FFT) operation. Accordingly, time domain data of the reference sequence can be converted into frequency domain data of the reference sequence via the FFT operation. After the frequency domain data of the training sequence and the frequency domain data of the reference sequence are obtained, they are conjugately multiplied.

In an embodiment of the present disclosure, the frequency domain data of the training sequence is set to rx_data, the frequency domain data of the reference sequence is set to ref_data, and the conjugate multiplication result mul_data obtained by conjugately multiplying these two is:

$$mul\_data = rx\_data * conj(ref\_data); \qquad (1)$$

In the formula (1), conj (ref_data) is a conjugate of ref_data.

Step S103, extracting a real part of the conjugate multiplication result.

In ideal channel conditions, the training sequence extracted from the data frame is the same as the reference sequence that is preset at the receiving end, that is, rx_data is equal to ref_data. Suppose ref_data=a+b*j, then:

$$mul\_data = (a+b*j)*(a-b*j) = a^2 + b^2; \qquad (2)$$

where j=sqrt(−1).

However, during practical use, the data frame will be subject to interference and other influence during a channel transmission process, resulting in a certain difference between the actually extracted training sequence and the reference sequence. Therefore, the calculated value of mul_data includes a real part and an imaginary part, rather than a pure real number. In an embodiment of the present disclosure, after mul_data is obtained through the calculation, its real part is taken.

In a specific implementation, the number of symbols of the training sequence is set to M, and the number of points of the FFT is set to N, then the extracted real part of the conjugate multiplication result is an array of M rows and N columns.

Step S104, averaging all values in each column of the M×N array, respectively, to obtain an output array of 1 row and N columns.

In a specific implementation, for each column of the M×N array, all values in each column are summed up, and the obtained sum value is divided by M to obtain an average value for each column, thus the output array of 1 row and N columns can be obtained.

Step S105, estimating, according to the value in each column of the output array of 1 row and N columns, whether valid data is transmitted over N sub-carriers corresponding to the output array of 1 row and N columns.

In a specific implementation, for the value in each column of the output array of 1 row and N columns, that is, for each value in the output array of 1 row and N columns, it is compared with a first threshold that is preset. When the $i^{th}$ value in the output array of 1 row and N columns is greater than the first threshold, it can be determined that valid data is transmitted over the $i^{th}$ sub-carrier of the N sub-carriers. Conversely, when the $i^{th}$ value in the output array of 1 row and N columns is not greater than the first threshold, it can be determined that no valid data is transmitted over the $i^{th}$ sub-carrier of the N sub-carriers.

For example, in the case of N=512, when the $1^{st}$ value in the output array of 1 row and 512 columns is greater than the first threshold, it can be determined that valid data is transmitted over the $1^{st}$ sub-carrier, that is, sub-carrier 1. When the $2^{nd}$ value in the output array of 1 row and 512 columns is not greater than the first threshold, it can be determined that no valid data is transmitted over the $2^{nd}$ sub-carrier, that is, sub-carrier 2.

In a specific implementation, when the valid data is transmitted over the sub-carriers, the training sequence will be simultaneously transmitted. Since it is predefined that the training sequence is the same as the reference sequence at the receiving end, the real part for the product obtained from a conjugate multiplication of the frequency domain data of the training sequence by the frequency domain data of the reference sequence is usually relatively large. Therefore, when the valid data is transmitted over the sub-carriers, the real part value of the corresponding conjugate multiplication result is relatively large. Hence, whether the valid data is transmitted over the sub-carriers can be determined by comparing the real part value of the conjugate multiplication result with the first threshold that is preset.

Thus, it can be seen that there is no need to introduce a complicated mathematical model in estimating whether valid data is transmitted over the sub-carriers. Whether the valid data is transmitted over the sub-carriers is attainable provided that a simple operation is performed. Therefore, a computation burden is effectively reduced for the sub-carrier estimation. The M×N array is obtained by extracting the real part of the conjugate multiplication result, and the output array of 1 row and N columns is obtained by averaging values corresponding to each column. It is estimated, according to the value in each column of the output array of 1 row and N columns, whether the valid data is transmitted over the N sub-carriers. Therefore, the accuracy of the sub-carrier estimation can be improved.

In a specific implementation, the value of the number of symbols M of the training sequence may be set according to actual application scenarios. The larger the M, the higher the accuracy with regard to estimating whether the valid data is transmitted over the estimated sub-carriers. Accordingly, since the training sequence at the transmitting end is relatively long, the data transmission efficiency at the transmitting end will be reduced. The smaller the M, the lower the accuracy with regard to estimating whether the valid data is transmitted over the estimated sub-carriers. Accordingly, since the training sequence at the transmitting end is relatively short, the data transmission efficiency at the transmitting end will be higher. During practical use, a trade-off can be made between the data transmission efficiency at the transmitting end and the accuracy of the estimation.

In a specific implementation, the transmitting end can also group the N sub-carriers according to an actual application scenario to obtain k sub-carrier groups. Respective sub-carrier groups are independent of each other, there is no intersection between any two of the sub-carrier groups, and adjacent sub-carriers in each sub-carrier group are adjacent to each other in a frequency domain. When performing modulation data mapping, the transmitting end performs the modulation data mapping in unit of sub-carrier groups; that is to say, valid data is transmitted over all sub-carriers in a sub-carrier group, or no valid data is transmitted over any of the sub-carriers in a sub-carrier group.

When grouping the N sub-carriers, in order to facilitate a hardware implementation, the N sub-carriers may be equally divided into k sub-carrier groups, and for the number of sub-carriers in each sub-carrier group, n=N/k. Also, it can be understood that the number of sub-carriers in respective sub-carrier groups may vary in grouping the N sub-carriers.

For example, in the case of N=512, 512 sub-carriers are equally divided into 16 sub-carrier groups, and for the number of sub-carriers in each sub-carrier group, n=512/16=32. The $1^{st}$ sub-carrier group includes sub-carriers 1 to 32, the $2^{nd}$ sub-carrier group includes sub-carriers 33 to 64, and similarly, the $16^{th}$ sub-carrier group includes sub-carriers 481 to 512.

After the output array of 1 row and N columns is obtained, the output array of 1 row and N columns corresponds to N sub-carriers. The output array of 1 row and N columns is accordingly divided into k groups according to the number of sub-carrier groups. All the data in each group of the k groups is averaged, respectively, to obtain k average values, and an output array of 1 row and k columns is formed.

For example, if 512 sub-carriers are equally divided into 16 sub-carrier groups, then the output array of 1 row and 512 columns is equally divided into 16 groups, and values in the output array of 1 row and 512 columns are sequentially $V_{L1}$~$V_{L512}$. $V_{L1}$~$V_{L32}$ in the output array of 1 row and 512 columns are averaged to obtain an average value corresponding to the $1^{st}$ sub-carrier group, and $V_{L1}$~$V_{L32}$ are values in the output array of 1 row and N columns corresponding to sub-carriers 1~32. $V_{L33}$~$V_{L64}$ in the output array of 1 row and 512 columns are averaged to obtain an average value corresponding to the $2^{nd}$ sub-carrier group, and $V_{L33}$~$V_{L64}$ are values in the output array of 1 row and N columns corresponding to sub-carriers 33~64. Similarly, average values corresponding to the remaining 14 sub-carrier groups are calculated, respectively, and an output array of 1 row and 16 columns is obtained.

After the output array of 1 row and k columns is obtained, the value in each column of the output array of 1 row and k columns can be compared with a second threshold that is preset. When the value in the $m^{th}$ column of the output array of 1 row and k columns is greater than the second threshold, it can be determined that valid data is transmitted over all of the n sub-carriers in the $m^{th}$ sub-carrier group; when the value in the $m^{th}$ column of the output array of 1 row and k columns is not greater than the second threshold, it can be determined that no valid data is transmitted over any of the n sub-carriers in the $m^{th}$ sub-carrier group.

For example, if 512 sub-carriers are equally divided into 16 sub-carrier groups, an output array of 1 row and 16 columns can be obtained. In the output array of 1 row and 16 columns, if the value in the $1^{st}$ column is greater than the second threshold, it can be determined that valid data is transmitted over all sub-carriers in the $1^{st}$ sub-carrier group, that is, valid data is transmitted over sub-carriers 1~32.

For another example, in the output array of 1 row and 16 columns, if the value in the $2^{nd}$ column is not greater than the second threshold, it can be determined that no valid data is transmitted over any of sub-carriers in the $2^{nd}$ sub-carrier group, that is, no valid data is transmitted over any of sub-carriers 33~64.

It can be derived at one time whether valid data is transmitted over multiple sub-carriers by grouping the N sub-carriers, respectively calculating the real part average value of the conjugate multiplication result corresponding to each sub-carrier in each group, then averaging the real part average values of the conjugate multiplication results corresponding to each sub-carrier group, and comparing the obtained results with the second threshold, thus the accuracy and efficiency of the sub-carrier estimation can be improved.

In a specific implementation, in the case of grouping the N sub-carriers, if the number of groups k is relatively small, the number of sub-carriers in each group is relatively large when the N sub-carriers are equally divided. When the number of sub-carriers in each group is relatively large, the sub-carrier estimation has a higher accuracy, and the sub-carrier estimation has a higher efficiency, however, there is a lower flexibility in using the sub-carriers.

In the case of grouping the N sub-carriers, if the number of groups k is relatively large, the number of sub-carriers in each group is relatively small when the N sub-carriers are equally divided. When the number of sub-carriers in each group is relatively small, the sub-carrier estimation has a lower accuracy, and the sub-carrier estimation has a lower efficiency, however, there is a higher flexibility in using the sub-carriers.

Therefore, the number of groups k may be selected according to actual usage requirements. If requirements on accuracy and efficiency are relatively high for the sub-carrier estimation, then k may take a smaller value, for instance, k=8 or k=16. If requirements on flexibility for the sub-carrier usage is relatively high, then k may take a large value, for example, k=32 or k=64. During practical use, k may also take other values, for details, description is omitted herein.

In an embodiment of the present disclosure, it can be predefined that the first threshold may be equal to the second threshold, or the first threshold may be unequal to the second threshold, depending on the actual application scenario.

In a specific implementation, after estimating which sub-carriers the valid data is transmitted over, the number of all sub-carriers of the N sub-carriers over which the valid data is transmitted can also be counted. Each of the estimation results of all the estimated sub-carriers over which the valid data is transmitted may be set to 1, and each of the estimation results of all the estimated sub-carriers over which no valid data is transmitted is set to 0, then a binary sequence of length N can be obtained. By counting the number of 1 in the binary sequence of length N, the number of sub-carriers over which the valid data is transmitted can be known.

In an embodiment of the present disclosure, a bit by bit addition is performed on the binary sequence of length N using an accumulator, and the obtained sum value is the number of sub-carriers over which the valid data is transmitted.

For example, N=512. If it is estimated that valid data is transmitted over sub-carrier 1, then the estimation result of the sub-carrier 1 may be set to 1. If it is estimated that no valid data is transmitted over sub-carrier 2, then the estimation result of the sub-carrier 2 may be set to 0. Similarly, a binary sequence of 512 bits in length is obtained, and the first two bits of the binary sequence are 10.

Steps S103~S105 provided in the above embodiments of the present disclosure will be described hereunder by way of examples.

Assume M=4 and N=512, reference may be made to Table 1 below for a real part of the extracted conjugate multiplication result.

TABLE 1

| $S_{1,1}$ | $S_{1,2}$ | $S_{1,3}$ | ... | $S_{1,31}$ | $S_{1,32}$ | $S_{1,33}$ | ... | $S_{1,512}$ |
|---|---|---|---|---|---|---|---|---|
| $S_{2,1}$ | $S_{2,2}$ | $S_{2,3}$ | ... | $S_{2,31}$ | $S_{2,32}$ | $S_{2,33}$ | ... | $S_{2,512}$ |
| $S_{3,1}$ | $S_{3,2}$ | $S_{3,3}$ | ... | $S_{3,31}$ | $S_{3,32}$ | $S_{3,33}$ | ... | $S_{3,512}$ |
| $S_{4,1}$ | $S_{4,2}$ | $S_{4,3}$ | ... | $S_{4,31}$ | $S_{4,32}$ | $S_{4,33}$ | ... | $S_{4,512}$ |

In Table 1, there is an array of 4 rows and 512 columns, where $S_{i,l}$ represents the real part of the conjugate multiplication result for the $l^{th}$ sub-carrier of the $i^{th}$ symbol, $1 \le i \le 4$, $1 \le l \le 512$.

All values of each column in Table 1 are averaged, respectively, to obtain 512 average values, where the average value of the $l^{th}$ column is: $V_{Ll}=(S_{1,l}+S_{2,l}+S_{3,l}+S_{4,l})/4$.

Reference may be made to Table 2 below for an output array of 1 row and 512 columns.

TABLE 2

| $V_{L1}$ | $V_{L2}$ | $V_{L3}$ | ... | $V_{L31}$ | $V_{L32}$ | $V_{L33}$ | ... | $V_{L63}$ | $V_{L64}$ | ... | $V_{L512}$ |
|---|---|---|---|---|---|---|---|---|---|---|---|

The value of each column in Table 2 is compared with the first threshold value $V_{th1}$, respectively. In Table 2, when the $l^{th}$ value $V_{Ll}>V_{th1}$, it is determined that valid data is transmitted over the $l^{th}$ sub-carrier; otherwise, when $V_{Ll} \le V_{th1}$, it is determined that no valid data is transmitted over the $l^{th}$ sub-carrier.

For example, if l=2, it is determined that valid data is transmitted over the $2^{nd}$ sub-carrier when $V_{L2}>V_{th1}$. When $V_{L2} \le V_{th1}$, it is determined that no valid data is transmitted over the $2^{nd}$ sub-carrier.

Similarly, after the value in each column of the output array of 1 row and 512 columns is compared with the first threshold value $V_{th1}$, respectively, 512 estimation results may be obtained.

When valid data is transmitted over the $l^{th}$ sub-carrier, the estimation result may be set to 1; when no valid data is transmitted over the $l^{th}$ sub-carrier, the estimation result may be set to 0; and finally the data of 512 bits in length can be obtained. By reading 512 bits of data, a bit of 1 is found therefrom. Valid data is transmitted over a sub-carrier corresponding to this bit.

To count the number of sub-carriers over which there is currently a valid data transmission, a bit by bit addition can be performed on the 512 bits of data, and the obtained sum value is the number of sub-carriers over which valid data is transmitted.

It can be seen from the above embodiments of the present disclosure that, in a specific implementation, the N sub-carriers can also be divided into k sub-carrier groups. For example, if 512 sub-carriers are equally divided into 16 sub-carrier groups, then each sub-carrier group includes 32 sub-carriers, where: the sub-carriers in the first sub-carrier group are sub-carriers 1 to 32, the sub-carriers in the second sub-carrier group are sub-carriers 33~64, and similarly, the sub-carriers in the $16^{th}$ sub-carrier group are sub-carriers 481~512.

The average value for the $m^{th}$ sub-carrier group is: $V_{Rm}=(V_{L(1+((m-1)\times 32))}+V_{L(2+((m-1)\times 32))}+V_{L(3+((m-1)\times 32))}+ \ldots +V_{L(m\times 32)})/32$, $1 \le m \le 16$. Then, the output array of 1 row and 512 columns in Table 2 may be simplified into an output array of 1 row and 16 columns, reference may be made to Table 3.

TABLE 3

| $V_{R1}$ | $V_{R2}$ | $V_{R3}$ | ... | $V_{R7}$ | $V_{R8}$ | $V_{R9}$ | ... | $V_{R16}$ |
|---|---|---|---|---|---|---|---|---|

Average values corresponding to the 16 sub-carrier groups are compared with the second threshold $V_{th2}$, respectively. When $V_{Rm}>V_{th2}$, it is determined that valid data is transmitted over all sub-carriers in the sub-carrier group; when $V_{Rm} \le V_{th2}$, it is determined that no valid data is transmitted over any of the sub-carriers in the sub-carrier group.

For example, for the average value corresponding to the $1^{st}$ sub-carrier group, when $V_{R1}>V_{th2}$, it is determined that valid data is transmitted over all 32 sub-carriers in the $1^{st}$ sub-carrier group, that is, the valid data is transmitted over sub-carriers 1~32. For the average value corresponding to the $1^{st}$ sub-carrier group, when $V_{R1} \le V_{th2}$, it is determined that no valid data is transmitted over any of the 32 sub-carriers in the 1$^{st}$ sub-carrier group, that is, no valid data is transmitted over any of the sub-carriers 1 to 32.

When it is estimated that valid data is transmitted over all sub-carriers in a certain sub-carrier group, each of the estimation results of all the sub-carriers in the sub-carrier group may be set to 1, that is, an all-ones number of 32 bits in length may be obtained. When it is estimated that no valid data is transmitted over any of the sub-carriers in a certain sub-carrier group, each of the estimation results of all the sub-carriers in the sub-carrier group may be set to 0, that is, an all-zeros number of 32 bits in length may be obtained.

Figure 2:
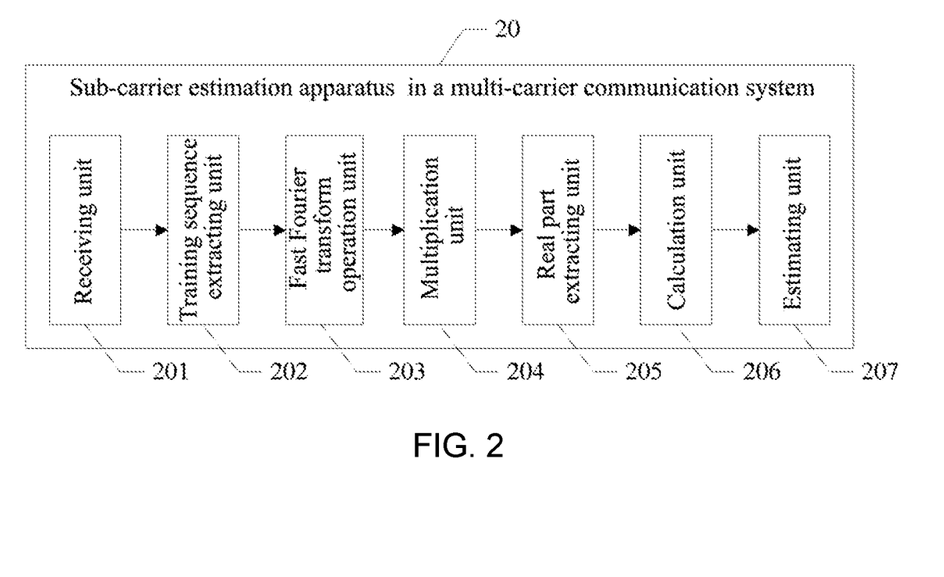
FIG. 2 is a schematic structural diagram of a sub-carrier estimation apparatus in a multi-carrier communication system according to an embodiment of the present disclosure.

With reference to FIG. 2, an embodiment of the present disclosure provides a sub-carrier estimation apparatus 20 in a multi-carrier communication system, including: a receiving unit 201, a training sequence extracting unit 202, a fast Fourier transform operation unit 203, a multiplication unit 204, a real part extracting unit 205, a calculation unit 206 and an estimating unit 207.

The receiving unit 201 is configured to receive a data frame transmitted by a transmitting end.

The training sequence extracting unit 202 is configured to extract a training sequence from the data frame.

The fast Fourier transform operation unit 203 is configured to perform a fast Fourier transform operation on the training sequence and a preset reference sequence, respectively, to obtain frequency domain data of the training sequence and frequency domain data of the reference sequence.

The multiplication unit 204 is configured to conjugately multiply the frequency domain data of the training sequence by the frequency domain data of the reference sequence.

The real part extracting unit 205 is configured to extract a real part of a conjugate multiplication result, where the real part of the conjugate multiplication result is an M×N array, with M being the number of symbols of the training sequence, and N being the number of points of the fast Fourier transform operation.

The calculation unit 206 is configured to average all values in each column of the M×N array, respectively, to obtain an output array of 1 row and N columns.

The estimating unit 207 is configured to estimate, according to a value in each column of the output array of 1 row and N columns, whether valid data is transmitted over N sub-carriers corresponding to the output array of 1 row and N columns.

In a specific implementation, the estimating unit 207 can be configured to sequentially compare values in the output array of 1 row and N columns with a first threshold that is preset; when the l$^{th}$ value in the output array of 1 row and N columns is greater than the first threshold, it is determined that the valid data is transmitted over the l$^{th}$ sub-carrier of the N sub-carriers; and when the l$^{th}$ value in the output array of 1 row and N columns is not greater than the first threshold, it is determined that no valid data is transmitted over the l$^{th}$ sub-carrier of the N sub-carriers; where 1≤l≤N.

In a specific implementation, the N sub-carriers can be divided into k sub-carrier groups, sub-carriers in any of the sub-carrier groups are adjacent to each other in a frequency domain, and there is no intersection between any two of the sub-carrier groups; the estimating unit 207 can be configured to: acquire, from the output array of 1 row and N columns, values corresponding to all sub-carriers in each sub-carrier group, respectively; and estimate whether the valid data is transmitted over all sub-carriers in the each sub-carrier group, respectively.

In a specific implementation, the estimating unit 207 can be configured to: calculate an average value for values corresponding to all sub-carriers in the each sub-carrier group, and compare the average value with a second threshold that is preset; when the average value for the values corresponding to all sub-carriers in the each sub-carrier group is greater than the second threshold, it is determined that the valid data is transmitted over all sub-carriers in the each sub-carrier group; and when the average value for the values corresponding to all sub-carriers in the each sub-carrier group is not greater than the second threshold, it is determined that no valid data is transmitted over any of the sub-carriers in the each sub-carrier group.

In a specific implementation, the sub-carrier estimation apparatus 20 in the multi-carrier communication system can further include: a counting unit (not shown in FIG. 2), configured to count the number of all sub-carriers, over which the valid data is transmitted, in the N sub-carriers.

In a specific implementation, the sub-carrier estimation apparatus 20 in the multi-carrier communication system can further include: a synchronization processing unit (not shown in FIG. 2), configured to perform synchronization processing on data in the data frame before the training sequence extracting unit extracts the training sequence from the data frame.

In a specific implementation, the training sequence includes any one of: a preamble sequence in the data frame for synchronization; or a data sequence that is preset in the data frame.

Persons of ordinary skill in the art may understand that, all or a part of the steps of the methods in the foregoing embodiments may be implemented by a program instructing relevant hardware. The program may be stored in a computer readable storage medium. The storage medium may include: a ROM, a RAM, a magnetic disk, an optical disc, or the like.

Although the present disclosure has been disclosed above, it is not limited thereto. Any person skilled in the art may make various changes and modifications without departing from the spirit and scope of the present disclosure. Therefore, the protection scope of the present disclosure shall be subject to the claims.

What is claimed is:

1. A sub-carrier estimation method in a multi-carrier communication system, comprising:
   receiving a data frame transmitted by a transmitting end, and extracting a training sequence from the data frame;
   performing a fast Fourier transform operation on the training sequence and a preset reference sequence, respectively, to obtain frequency domain data of the training sequence and frequency domain data of the reference sequence, and conjugately multiplying the frequency domain data of the training sequence by the frequency domain data of the reference sequence;
   extracting a real part of a conjugate multiplication result, wherein the real part of the conjugate multiplication result is an M×N array, with M being the number of symbols of the training sequence, and N being the number of points of the fast Fourier transform operation;
   averaging all values in each column of the M×N array, respectively, to obtain an output array of 1 row and N columns; and
   estimating, according to a value in each column of the output array of 1 row and N columns, whether valid data is transmitted over N sub-carriers corresponding to the output array of 1 row and N columns.

2. The sub-carrier estimation method in the multi-carrier communication system according to claim 1, wherein the estimating, according to the value in each column of the output array of 1 row and N columns, whether the valid data is transmitted over the N sub-carriers corresponding to the output array of 1 row and N columns comprises:

sequentially comparing values in the output array of 1 row and N columns with a first threshold that is preset;

when an $l^{th}$ value in the output array of 1 row and N columns is greater than the first threshold, it is determined that the valid data is transmitted over an $l^{th}$ sub-carrier of the N sub-carriers; and when the $l^{th}$ value in the output array of 1 row and N columns is not greater than the first threshold, it is determined that no valid data is transmitted over the $l^{th}$ sub-carrier of the N sub-carriers; wherein 1≤l≤N.

3. The sub-carrier estimation method in the multi-carrier communication system according to claim 1, wherein the N sub-carriers are divided into k sub-carrier groups, sub-carriers in any of the sub-carrier groups are adjacent to each other in a frequency domain, and there is no intersection between any two of the sub-carrier groups; the estimating, according to the value in each column of the output array of 1 row and N columns, whether the valid data is transmitted over the N sub-carriers corresponding to the output array of 1 row and N columns comprises:

acquiring, from the output array of 1 row and N columns, values corresponding to all sub-carriers in each sub-carrier group, respectively; and estimating whether the valid data is transmitted over all sub-carriers in the each sub-carrier group, respectively.

4. The sub-carrier estimation method in the multi-carrier communication system according to claim 3, wherein the estimating whether the valid data is transmitted over all sub-carriers in the each sub-carrier group, respectively, comprises:

calculating an average value for values corresponding to all sub-carriers in the each sub-carrier group, and comparing the average value with a second threshold that is preset;

when the average value for the values corresponding to all sub-carriers in the each sub-carrier group is greater than the second threshold, it is determined that the valid data is transmitted over all sub-carriers in the each sub-carrier group; and when the average value for the values corresponding to all sub-carriers in the each sub-carrier group is not greater than the second threshold, it is determined that no valid data is transmitted over any of the sub-carriers in the each sub-carrier group.

5. The sub-carrier estimation method in the multi-carrier communication system according to claim 1, wherein after the estimating whether the valid data is transmitted over the N sub-carriers corresponding to the output array of 1 row and N columns, the method further comprises:

counting the number of sub-carriers, over which the valid data is transmitted, in the N sub-carriers.

6. The sub-carrier estimation method in the multi-carrier communication system according to claim 2, wherein after the estimating whether the valid data is transmitted over the N sub-carriers corresponding to the output array of 1 row and N columns, the method further comprises:

counting the number of sub-carriers, over which the valid data is transmitted, in the N sub-carriers.

7. The sub-carrier estimation method in the multi-carrier communication system according to claim 3, wherein after the estimating whether the valid data is transmitted over the N sub-carriers corresponding to the output array of 1 row and N columns, the method further comprises:

counting the number of sub-carriers, over which the valid data is transmitted, in the N sub-carriers.

8. The sub-carrier estimation method in the multi-carrier communication system according to claim 4, wherein after the estimating whether the valid data is transmitted over the N sub-carriers corresponding to the output array of 1 row and N columns, the method further comprises:

counting the number of sub-carriers, over which the valid data is transmitted, in the N sub-carriers.

9. The sub-carrier estimation method in the multi-carrier communication system according to claim 1, wherein before the extracting the training sequence from the data frame, the method further comprises:

performing synchronization processing on data in the data frame.

10. The sub-carrier estimation method in the multi-carrier communication system according to claim 9, wherein the training sequence comprises any one of:

a preamble sequence in the data frame for synchronization; or a data sequence that is preset in the data frame.

11. A sub-carrier estimation apparatus in a multi-carrier communication system, comprising: a processor and a memory; wherein the memory stores instructions executable by the processor to perform operations comprising:

receiving a data frame transmitted by a transmitting end;

extracting a training sequence from the data frame;

performing a fast Fourier transform operation on the training sequence and a preset reference sequence, respectively, to obtain frequency domain data of the training sequence and frequency domain data of the reference sequence;

conjugately multiplying the frequency domain data of the training sequence by the frequency domain data of the reference sequence;

extracting a real part of a conjugate multiplication result, wherein the real part of the conjugate multiplication result is an M×N array, with M being the number of symbols of the training sequence, and N being the number of points of the fast Fourier transform operation;

averaging all values in each column of the M×N array, respectively, to obtain an output array of 1 row and N columns; and estimating, according to a value in each column of the output array of 1 row and N columns, whether valid data is transmitted over N sub-carriers corresponding to the output array of 1 row and N columns.

12. The sub-carrier estimation apparatus in the multi-carrier communication system according to claim 11, wherein the operations further comprise:

sequentially comparing values in the output array of 1 row and N columns with a first threshold that is preset;

when an $l^{th}$ value in the output array of 1 row and N columns is greater than the first threshold, it is determined that the valid data is transmitted over an $l^{th}$ sub-carrier of the N sub-carriers; and when the $l^{th}$ value in the output array of 1 row and N columns is not greater than the first threshold, it is determined that no valid data is transmitted over the $l^{th}$ sub-carrier of the N sub-carriers; wherein 1≤l≤N.

13. The sub-carrier estimation device in the multi-carrier communication system according to claim 11, wherein the N sub-carriers are divided into k sub-carrier groups, sub-carriers in any of the sub-carrier groups are adjacent to each other in a frequency domain, and there is no intersection between any two of the sub-carrier groups; the operations further comprise:

acquiring, from the output array of 1 row and N columns, values corresponding to all sub-carriers in each sub-carrier group, respectively; and estimating whether the valid data is transmitted over all sub-carriers in the each sub-carrier group, respectively.

14. The sub-carrier estimation apparatus in the multi-carrier communication system according to claim 13, wherein the operations further comprise:

calculating an average value for values corresponding to all sub-carriers in the each sub-carrier group, and comparing the average value with a second threshold that is preset;

when the average value for the values corresponding to all sub-carriers in the each sub-carrier group is greater than the second threshold, it is determined that the valid data is transmitted over all sub-carriers in the each sub-carrier group; and when the average value for the values corresponding to all sub-carriers in the each sub-carrier group is not greater than the second threshold, it is determined that no valid data is transmitted over all sub-carriers in the each sub-carrier group.

15. The sub-carrier estimation apparatus in the multi-carrier communication system according to claim 11, wherein the operations further comprise:

counting the number of sub-carriers, over which the valid data is transmitted, in the N sub-carriers.

16. The sub-carrier estimation apparatus in the multi-carrier communication system according to claim 12, wherein the operations further comprise:

counting the number of sub-carriers, over which the valid data is transmitted, in the N sub-carriers.

17. The sub-carrier estimation apparatus in the multi-carrier communication system according to claim 13, wherein the operations further comprise:

counting the number of sub-carriers, over which the valid data is transmitted, in the N sub-carriers.

18. The sub-carrier estimation apparatus in the multi-carrier communication system according to claim 14, wherein the operations further comprise:

counting the number of sub-carriers, over which the valid data is transmitted, in the N sub-carriers.

19. The sub-carrier estimation apparatus in the multi-carrier communication system according to claim 11, wherein the operations further comprise:

performing synchronization processing on data in the data frame before the training sequence extracting unit extracts the training sequence from the data frame.

20. The sub-carrier estimation apparatus in the multi-carrier communication system according to claim 19, wherein the training sequence comprises any one of: a preamble sequence in the data frame for synchronization; or a data sequence that is preset in the data frame.

* * * * *